United States Patent Office 2,971,772
Patented Feb. 14, 1961

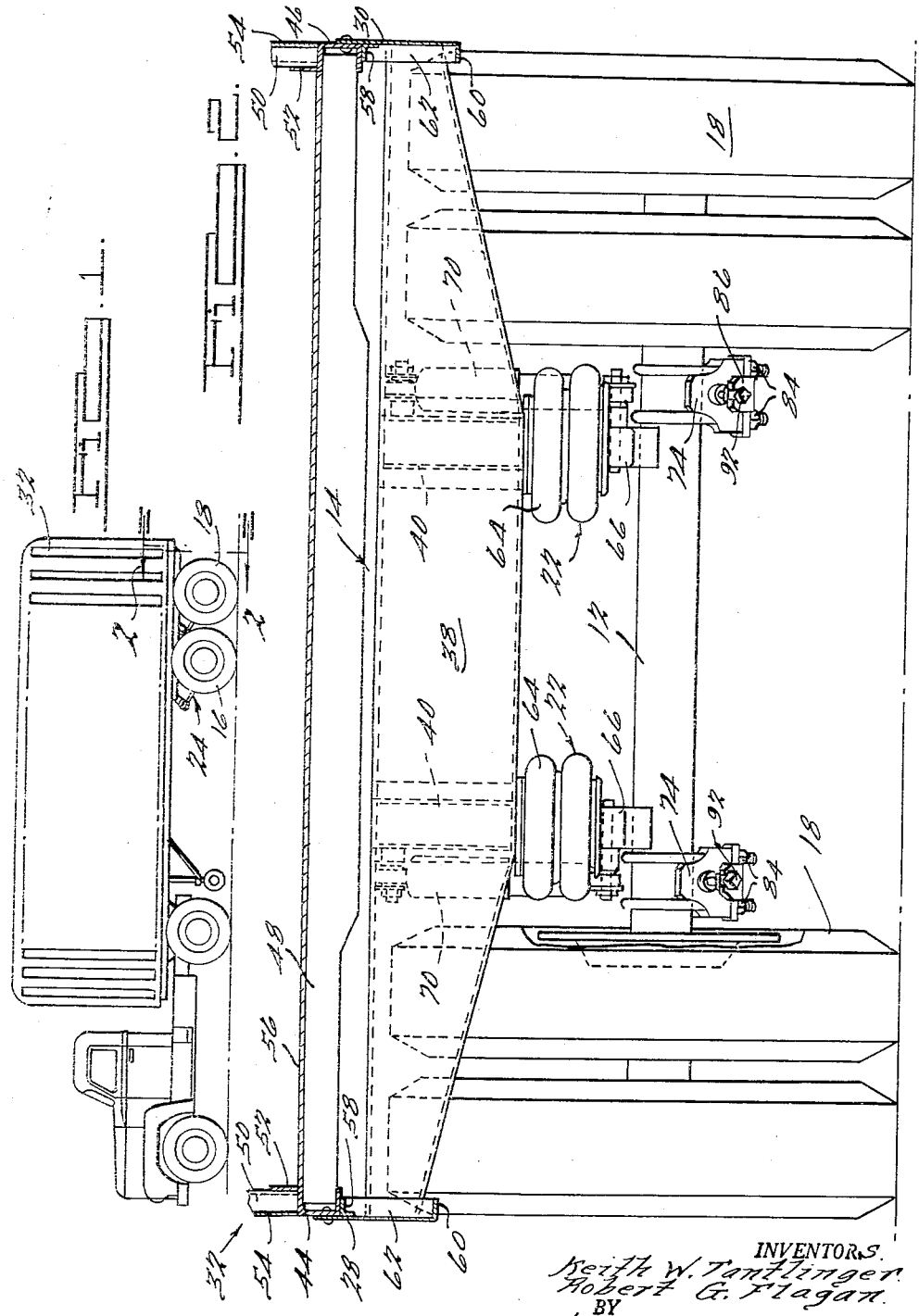

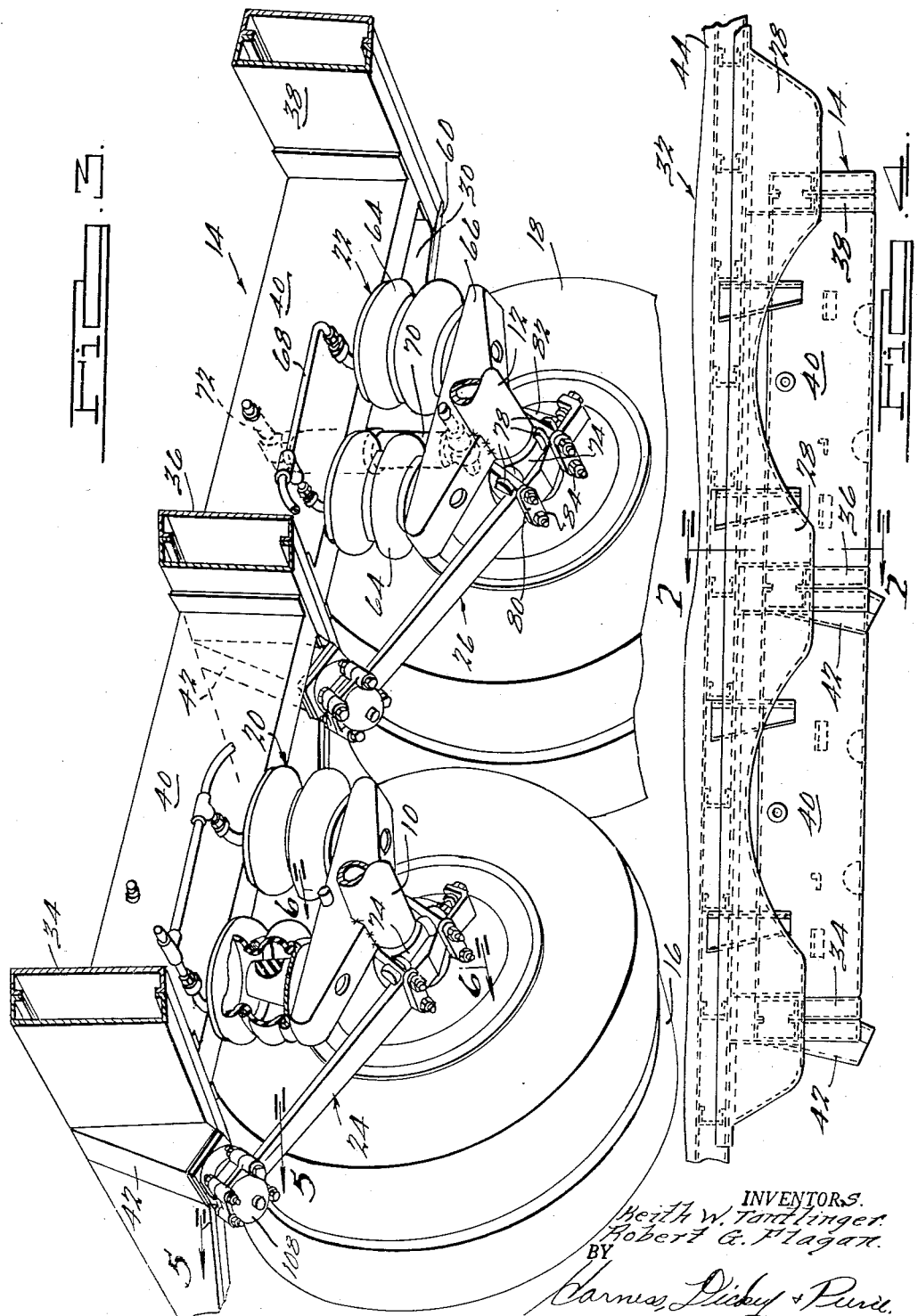

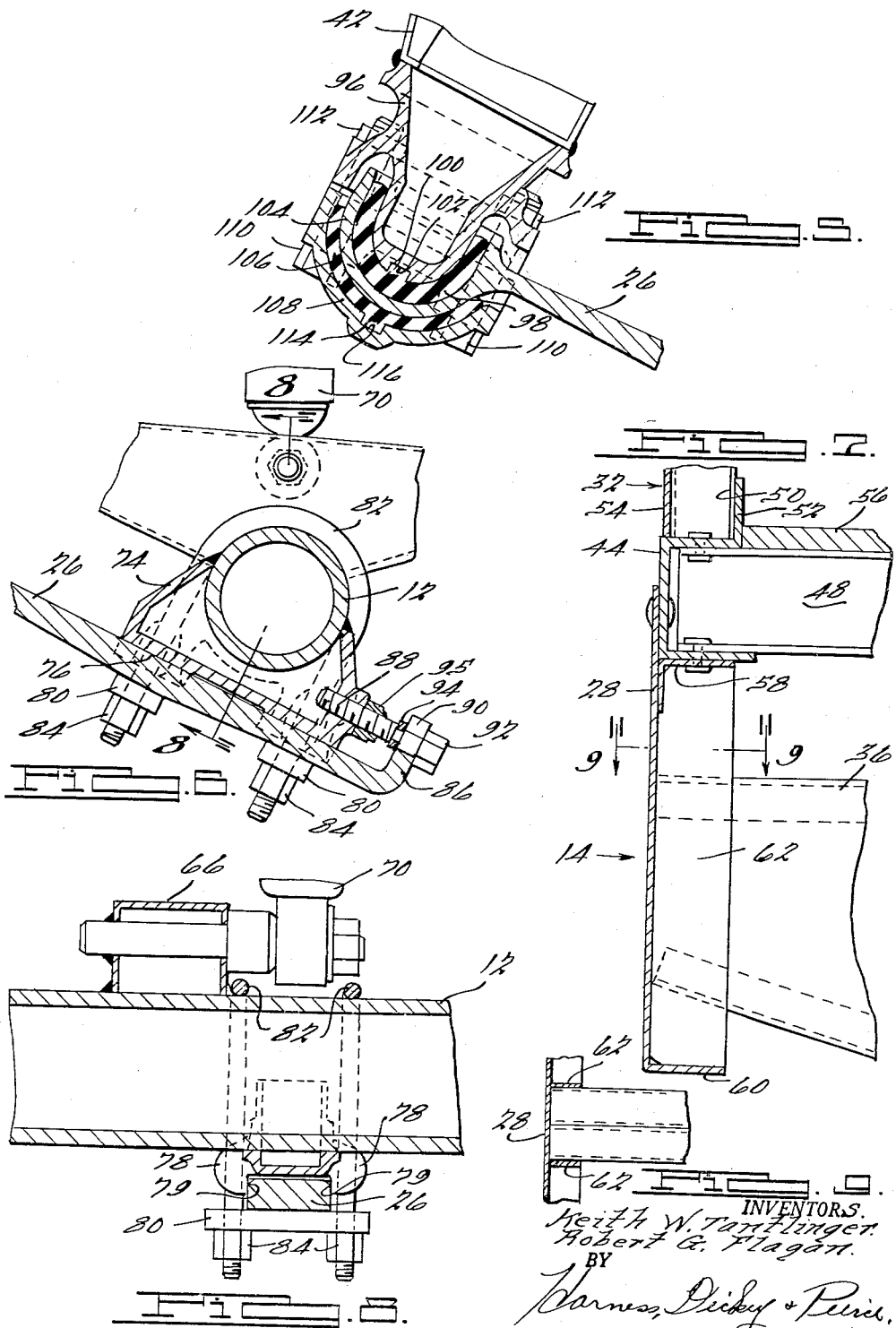

2,971,772

WHEEL SUSPENSION AND CANTILEVER SPRING BRACING THEREFOR FOR TRAILER

Keith W. Tantlinger, Grosse Pointe Shores, and Robert G. Flagan, Mount Clemens, Mich., assignors to Fruehauf Trailer Company, Detroit, Mich., a corporation of Michigan Filed Mar. 18, 1959, Ser. No. 800,255

6 Claims. (Cl. 280—124)

This invention relates to new and useful improvements in wheel suspensions for trailers and the like.

Briefly, the wheel suspension of this invention comprises a transverse through axle carrying road wheels, a rigid frame connected to the body of the trailer, air springs supporting the frame on the axle and uniform stress cantilever leaf spring members rigidly connected to and extending forwardly from the axle pivotally connected at the forward ends thereof to the frame. The leaf spring members are connected to the axle adjacent opposite ends thereof and the pivots which connect the springs to the frame are rubber mounted ball pivots. The combined action of the leaf springs and the rubber pivot mountings permits the axle to move vertically against the air springs while limiting or, for all practical purposes, preventing lateral shifting of the axle relative to the frame. Hydraulic shock absorbers are connected across the air springs to dampen oscillation of the suspension.

Two or more axles can be incorporated in the suspension if desired.

The unique construction and mounting of the leaf spring members permit them to combine in a single structure the functions usually performed in conventional suspensions by a number of separate individual components. Specifically, the spring members provide a tow connection between the frame and the axle, they provide lateral stability for the trailer and prevent excessive sway of the trailer body in operation, they absorb brake torque when the brakes are applied, and they position the axle laterally under the body eliminating the need for Panhard rod or track bar attachments.

For a more detailed description of the invention reference is had to the accompanying drawings wherein:

Figure 1 is a side elevational view of a trailer having a tandem axle suspension embodying the invention, Fig. 2 is an enlarged, fragmentary, transverse sectional view taken on the line 2—2 of Figure 1, Fig. 3 is a fragmentary perspective view showing one side of the wheel suspension, Fig. 4 is an enlarged, fragmentary, side elevational view of the trailer and its suspension, Fig. 5 is an enlarged, fragmentary, sectional view taken on the line 5—5 of Fig. 3, Fig. 6 is an enlarged, fragmentary, sectional view taken on the line 6—6 of Fig. 3, Fig. 7 is an enlarged, fragmentary, vertical sectional view taken on the line 7—7 of Fig. 4, Fig. 8 is a fragmentary, sectional view taken on the line 8—8 of Fig. 6, and Fig. 9 is a fragmentary, horizontal sectional view taken on the line 9—9 of Fig. 7.

The particular embodiment of the invention shown by way of example in the drawings comprises a tandem suspension having a pair of spaced parallel through axles 10 and 12 and a strong, rigid essentially rectangular horizontal main supporting frame 14 spaced above the axles. Dual road wheels 16 and 18 are mounted on the axles 10 and 12 respectively. Air spring assemblies 20 and 22, preferably located just inside the wheels 16 and 18, support the frame 14 on the axles 10 and 12, and pairs of uniform stress cantilever springs 24 and 26 fastened to axles 10 and 12 respectively preferably between the air springs and the wheels also connect the axles to the frame 14.

While the suspension here shown is a tandem suspension having two axles 10 and 12 it will be readily apparent that the suspension can be made with only one axle or with more than two axles. Also, it will be apparent from the drawings that each axle is identically mounted under the frame 14 regardless of the number of axles used in the suspension. In order to simplify the disclosure, a detailed description of only the rear axle assembly is given herein and it will be understood that the front axle assembly is identical in all material respects to the rear axle assembly.

The frame 14 is essentially strong and rigid so as not to flex or yield to any significant extent under the movement of the road wheels in use or under brake torque effect resulting when the trailer brakes are applied or under the weight or movement of the body 32 in use. The particular frame 14 here shown by way of illustration comprises a pair of parallel longitudinal side rails 28 and 30 spaced and arranged to extend along opposite side edges of the trailer body 32. Spaced parallel transverse structural members 34, 36 and 38 extend between and are welded to the side rails 28 and 30. The transverse members 34, 36 and 38 are spaced sufficiently so that the front member 34 is ahead of the front wheel assembly, the middle member 36 is between the front and rear wheel assemblies and the rear member 38 is behind the rear wheel assembly. Spaced, parallel longitudinal rails 40 extend between and are welded to the transverse frame members 34, 36 and 38 inwardly of and adjacent to the wheels 16 and 18 for engagement by the air spring assemblies 20 and 22, as perhaps best shown in Figs. 2 and 3. Angularly forwardly and downwardly inclined mounting brackets 42 are provided on the transverse members 34 and 36 for connection with the leaf spring members 24 and 26.

The particular frame 14 here shown is adapted to be attached to the trailer body 32 at the side edges thereof. However, the suspension can be used on any type of trailer and it may be necessary in some instances to modify the frame 14 to fit a particular trailer construction or to modify the connection of mode of attachment of the suspension to the frame or body of the trailer. A typical form of van-type trailer body 32 is shown in the drawings by way of illustration, and in this application the frame 14, of course, is adapted to that particular body.

The body 32 has inwardly facing longitudinal frame members having channel shaped portions 44 and 46 interconnected at spaced intervals along the length thereof by transverse floor joists 48. The ends of the joists 48 fit between and are embraced by the flanges of the channel portions 44 and 46 and are welded, riveted, or otherwise fastened thereto. Vertical posts 50 are mounted on the top flanges of the channel portions 44 and 46 and against upstanding flange portions 52 on the top flanges. The posts 50 are riveted, welded, or otherwise fastened to the flanges 52 and the side skin panels 54 of the trailer body are riveted or otherwise attached to the posts 50. A floor covering 56 of sheet metal or the like is disposed on and supported by the joists 48 between the side walls of the body 32.

Other structural details of the body 32 are not shown as they have no bearing on the present invention, and it will be understood that any suitable or conventional construction can be employed for the body.

The side rails 28 and 30 here shown are formed sheet metal members which extend along the sides of the trailer body, as shown in Fig. 4, with the upper marginal portion thereof overlapping and riveted or otherwise fastened securely to the channel side members 44 and 46. Angle strips 58 on the inner sides of the side rails engage the lower flanges of the channel side members 44 and 46 and are suitably fastened thereto. The lower edges of the side rails 28 and 30 conveniently can be recessed to accommodate the road wheels 16 and 18 and are flanged as at 60 for additional stiffening and strength. Vertical webs 62 at opposite sides of the transverse frame members 34, 36 and 38 are welded thereto and to the side rails 28 and 30. The angle strips 58 and the flanges 60 assist in holding the frame members 34, 36 and 38 attached securely to the side rails 28 and 30.

Each of the air spring assemblies 20 and 22 comprises a pair of bellows type pneumatic springs 64 mounted side-by-side on a support 66 welded to the axle, as shown in the drawing. The upper ends of the bellows 64 bear against one of the longitudinal rails 40 of the frame 14. As suggested, an air spring assembly is provided at each end of each axle. Thus, a tandem suspension of the type here shown has two air spring assemblies on each axle. Tubing 68 connects the upper ends of each pair of bellows 64, and the tubing from the different air springs in the assemblies conveniently can be connected to a suitable air reservoir (not shown) and valved according to conventional practice so that air is transferred between the reservoir and the bellows springs 64 to maintain a constant relation between the body 32 and the axle assemblies.

A conventional hydraulic shock absorber 70 is connected between the axle assembly and the frame 14 adjacent each air spring assembly 20 and 22 to provide oscillation damping. In the form of the invention shown (Fig. 3), each shock absorber 70 is connected at its lower end to a respective air spring support 66. The upper ends of each shock absorber 70 is connected at 72 to the longitudinal frame rail 40.

As suggested, each leaf spring assembly is identical and a detailed description of one only therefore, is given. The particular assembly shown in detail in the drawing is the right hand assembly on the rear axle 12. The leaf spring 26 and, for that matter, all of the leaf springs 24 and 26, taper gradually toward the leading end thereof to distribute stress uniformly along its length. At the rearward or trailing end of the spring 26 is a mounting member 74 which is welded or otherwise fixed to the axle 12. As shown in Fig. 6, the mounting member 74 has an angularly upwardly and forwardly inclined flat supporting surface 76 which seats the leaf spring 26. Lugs 78 on the sides of the mounting member 74 extend below the supporting surface 76 to provide shoulders 79 which embrace and snugly receive the leaf spring 26 to hold the latter securely against lateral movement relative to the mounting member. In this connection, it will be observed that lugs 78 are provided at both the front and rear of the mounting bracket 74 so that the shoulders 79 engage the spring 26 at longitudinally spaced points whereby to prevent angular movement or shifting of the springs in the plane of the supporting surface 76. Spaced cross bars 80 underlying the leaf spring 26 are retained by U-bolts 82 and nuts 84. A U-bolt 82 is provided at each side of the mounting member 74; and, in the form of the invention shown, the U-bolts are received and retained by notches provided in the lugs 78. When the nuts 84 are tightened, they draw the cross bars 80 solidly against the spring 26 to hold the latter rigidly attached to the mounting member 74. By reason of this construction, the portion of leaf spring 26 extending forwardly beyond the mounting member 74 is free to flex but it is held absolutely securely and rigidly against movement in any direction relative to the mounting member 74.

Alignment of the axles 10 and 12 under the trailer body 32 is accomplished by adjusting the leaf springs 24 and 26 longitudinally on the supporting members 74. The leaf springs are formed with upturned rear portions 86 and Fig. 6 shows this construction particularly with respect to the spring 26. An adjusting screw 88 threaded into the supporting member 74 extends through a notch 90 in the portion 86, and the latter is confined between the head 92 of the screw and a snap ring or flange 94 on the screw. A lock nut 95 on the screw 88 bears on the supporting member 74. When the retaining nuts 84 and lock nut 95 are loosened, the screw 88 can be turned to move the leaf spring 26 longitudinally relative to the mounting member 74, and, inasmuch as the forward end of the spring is fixed to the frame 14, relative movement between the spring and the mounting member 74 advances or retracts one end of the axle 12. Since there is a spring assembly at each end of the axle 12 adjustment of the assemblies in the manner described permits the axle to be aligned within the limits of adjustment permitted by the screws 88. Manifestly, tightening of the retaining nuts 84 and lock nut 95 holds the axle securely in the selected adjusted position.

Welded or otherwise fastened securely on the mounting bracket 42 is a ball retainer 96 which holds the forward end of the spring 26. A hollow hemispherical bushing 98 of a suitably resilient material such as rubber or the like fits snugly over the ball end of the retainer 96 and an embossment 100 formed centrally on and at the inner side of the bushing fits into and is snugly received by a recess 102 in the retainer. Similarly, a cup-shaped terminal portion 104 on the forward or leading end of the leaf spring 26 fits over and snugly receives the bushing 98. An outer bushing 106, also of rubber or the like, fits over and snugly receives the spring terminal portion 104. All of the above parts are clamped solidly together by a cap 108 which is fastened securely to the retainer 96 by screws 110 and nuts 112. An external central embossment 114 on the bushing 106 extends into and is snugly received by a recess 116 in the cap 108.

The front end mountings for the leaf springs 24 and 26 permit them to rock or pivot against the resilient action of the inner and outer bushings 98 and 106 but prevent translational movement of the springs in all directions. This unique pivotal mounting at the forward ends of the springs 24 and 26 in combination with the rigid rear end connections thereof hold the axle against lateral movements relative to the trailer body. At the same time each road wheel is free to move vertically independently of the others. Moreover, the unique configuration of the leaf springs 24 and 26 and the rubber mounted pivot connections which fasten the springs to the frame 14 incorporate into a single member the separate functions performed heretofore by a plurality of different components. The advantage of combining these functions includes a reduction in weight, a saving of cost, improved performance, elimination of maintenance, and standardization of single axle, double axle, widespread and slider underconstructions. The trailing leaf spring construction provides improved brake torque control, sway control, axle towing action and lateral stability.

In each axle assembly brake torque control is provided by spring deflection of the trailing leaf springs 24 and 26 limited and retained by the rubber mounted pivots which attach the forward ends of the springs to the frame 14. When braking friction causes a relative force between the axle assembly and the body 32, deflection of the tapered cross-section spring members 24 and 26 controls and counteracts this force. The location of the rubber socket assemblies at the forward ends of the leaf springs 24 and 26 and the rigid spring seat mountings which connect the trailing ends of the leaf springs to the axles also play an important part in the brake torque control.

Sway control is achieved at least in part by the fact that leaf springs 24 and 26 are rigidly attached at their rearward ends to the axles 10 and 12. This construction in effect makes a one-piece member of each axle and its attached leaf springs, and since the leaf springs are pivotally connected to the frame 14 by means which allows free rotational or deflectional pivoting but restricts completely translational movement of the springs, the axles can move sideways under the frame 14 only by lateral flexure of the leaf springs. Inasmuch as the frame 14 is fastened rigidly to the trailer body 32, sway of the body due to the centrifugal forces or vertical movement of the road wheels is controlled and limited by the amount of deflection in the leaf springs 24 and 26. For all practical purposes the axles 10 and 12 are rigid, and bending in the calculated, tapered cross-section of the trailing leaf springs 24 and 26 provides the antisway force.

Axle towing action is supplied by the fact that forward movement of the body structure transmits the towing force through the rubber mounted sockets as a tensile force in the trailing leaf springs 24 and 26 and through the spring mount castings 74 and the U-bolt attachments to the axles themselves. Positive alignment to assure a true direction of towing is accomplished by the adjusting screws 88. Correct alignment is retained by friction between the leaf springs 24 and 26 and the mounting members 74 maintained by the nuts 84 on U-bolts 82.

Lateral stability in the trailer is taken care of by the close fit between the trailing leaf springs 24 and 26 and the spring seat castings 74 at the rearward ends of the springs and by the rubber mounted sockets at the forward ends thereof. The springs 24 and 26 are designed with tapered rectangular sections which allow minimum deflection in a horizontal plane, thereby controlling lateral displacement of the axle assemblies with respect to the body structure. At the forward ends of the trailing leaf spring members 24 and 26, the hemispherically shaped concave top and convex bottom rubber mounted sockets 104 prevent lateral displacement while allowing free movement in other planes. In performing this function the instant construction eliminates the requirement of a Panhard rod or other transverse tension and compression member which usually is pin-end attached in an approximately horizontal position to the body at one side and to the axle assembly at the other side of the vehicle. In a conventional eliptical leaf spring suspension, lateral stability is provided through the leaf springs and their shackle mountings. These mountings provide wear points which are eliminated by the instant design wherein movement occurs only in deflection of the springs 24 and 26 and in internal shear-type deflection within the rubber socket bushings 98 and 106.

What is claimed is:

1. A trailer having a body structure and a wheel suspension therefor comprising a rigid frame underlying said body structure and fastened thereto at the side edges thereof, a transverse through axle carrying road wheels disposed under said frame, air springs interposed between the frame and the axle supporting the weight of the body and its load on said axle, uniform stress cantilever springs extending longitudinally of the trailer at opposite sides thereof and forwardly of the axle, supports fixed to said axle having seats receiving the trailing end portions of said cantilever springs and shoulders embracing and snugly fitting the sides of said cantilever springs, said cantilever springs being individually slidably adjustable on said seats between said shoulders, and means holding said cantilever springs securely in selected adjusted positions including backup screws connected to said supports and to said cantilever springs, said backup screws being adjustable to align the axle under the trailer and to hold the same in a selected adjusted position, and pivot connections between the forward ends of said cantilever springs and said frame comprising ball mountings on the frame, hemispherical connecting portions on said cantilever springs overlying said ball mountings, caps overlying the connecting portions of said cantilever springs and fastened to said mountings, and formed rubber bushings interposed between and confined by said connecting portions and said ball mountings and between said connecting portions and said caps permitting free rotational or deflectional pivoting of said cantilever springs on said ball mountings but restricting translatory movement of said cantilever springs in all directions.

2. A trailer having a body and a wheel suspension therefor comprising a rigid frame underlying said body and fastened thereto, a transverse through axle carrying road wheels disposed under said frame, springs between the frame and the axle, uniform stress cantilever springs extending longitudinally of the trailer at opposite sides thereof, means fixedly connecting the rearward ends of said cantilever springs to the axle including spring seats welded to the axle and having spaced shoulders closely receiving opposite sides of said cantilever springs and holding the same rigidly against lateral or angular movement relative to the seat, said cantilever springs extending forwardly of the axle, and pivot connections fastening the forward ends of said cantilever springs to said frame, said pivot connections including connecting portions on said cantilever springs, and molded resilient mounting members confining said connecting portions.

3. A wheel suspension for trailers and the like comprising a through axle carrying road wheels, a rigid frame overlying the axle, air springs supporting said frame on said axle, longitudinally disposed uniform stress cantilever springs providing a tow connection between the frame and said axle, means providing a longitudinally adjustable rigid connection between said cantilever springs and said axle, and pivot connections between said cantilever springs and said frame, said pivot connections including ball mountings on the frame, hemispherical connecting portions on said cantilever springs overlying said ball mountings, caps overlying the connecting portions of said cantilever springs and fastened to said ball mountings, formed resilient bushings interposed between and confined by said connecting portions and said ball mountings and between said connecting portions and said pivot connections permitting free rotational and deflectional pivoting of said cantilever springs on said ball mountings but restricting translatory movement of said cantilever springs in all directions.

4. A trailer having a load carrying structure and a wheel suspension therefor comprising a rigid frame underlying said structure and fastened thereto, a transverse through axle carrying road wheels and disposed under said frame, air springs interposed between the frame and the axle and connected thereto, uniform stress cantilever springs extending longitudinally of the trailer at opposite sides thereof and forwardly of the axle, supports fixed to said axle having seats receiving the trailing end portions of said cantilever springs and shoulders embracing and snugly fitting the sides of said cantilever springs, means holding the cantilever springs solidly on said seats and between said shoulders whereby the trailing ends of said cantilever springs are held rigidly with respect to said axle, and pivot connections between the forward ends of said cantilever springs and said frame comprising ball mountings on the frame, hemispherical connecting portions on said cantilever springs overlying said ball mountings, caps overlying the connecting portions of said cantilever springs and fastened to said mountings, and formed rubber bushings interposed between and confined by said connecting portions and said ball mountings and between said connecting portions and said caps permitting free rotational or deflectional pivoting of said cantilever springs on said ball mountings but restricting translatory movement of said cantilever springs in all directions.

5. A wheel suspension for trailers and the like comprising a through axle carrying road wheels, a rigid frame overlying said axle, air springs supporting said frame on said axle, a pair of uniform stress cantilever springs extending substantially at right angles forwardly of said axle at opposite sides of the frame, means fastening the rearward ends of said cantilever springs rigidly to the axle, and means pivotally connecting the forward ends of said cantilever springs to said frame comprising ball mountings on the frame, hemispherical connecting portions on said cantilever springs overlying said ball mountings, caps overlying the connecting portions of said cantilever springs and fastened to said mountings, and cupped resilient bushings interposed between and confined by said connecting portions and said ball mountings and between said connecting portions and said caps permitting free rotational and deflectional pivoting of said cantilever springs on said ball mountings but restricting translatory movement of said cantilever springs in all directions.

6. A wheel suspension for trailers and the like comprising a through axle carrying road wheels, a rigid frame overlying said axle, springs supporting said frame on said axle, a pair of uniform stress cantilever springs extending forwardly of said axle at opposite sides of the frame, means fastening the rearward ends of said cantilever springs rigidly to the axle, and means pivotally connecting the forward ends of said cantilever springs to said frame comprising ball mountings on the frame, hemispherical connecting portions on said cantilever springs overlying said ball mountings, caps overlying the connecting portions of said cantilever springs and fastened to said mountings, and cupped resilient bushings interposed between and confined by said connecting portions and said ball mountings and between said connecting portions and said caps permitting free rotational and deflectional pivoting of said cantilever springs on said ball mountings but restricting translatory movement of said cantilever springs in all directions.

References Cited in the file of this patent

UNITED STATES PATENTS

| | | |
|---|---|---|
| 1,461,497 | Robbins | July 10, 1923 |
| 1,589,943 | Cook | June 22, 1926 |
| 2,367,817 | Brown | Jan. 23, 1945 |
| 2,494,683 | Aspin | Jan. 17, 1950 |
| 2,745,661 | Raden | May 15, 1956 |
| 2,746,762 | Scholtze | May 22, 1956 |
| 2,806,713 | Muller | Sept. 17, 1957 |
| 2,869,891 | Venditty | Jan. 20, 1959 |